US 6,663,319 B1

(12) United States Patent
Barker

(10) Patent No.: US 6,663,319 B1
(45) Date of Patent: Dec. 16, 2003

(54) SEWER LINING SYSTEM

(76) Inventor: George Bradley Barker, 422 W. Howard Ave., Orange City, FL (US) 32763

( * ) Notice: Subject to any disclaimer, the term of this patent is extended or adjusted under 35 U.S.C. 154(b) by 0 days.

(21) Appl. No.: 10/153,750

(22) Filed: May 24, 2002

(51) Int. Cl.$^7$ .................. E21D 11/00; F16L 55/18; F16L 9/00
(52) U.S. Cl. ................. 405/184.2; 405/150.1; 138/158
(58) Field of Search .............. 405/146, 150.1, 405/184.1, 184.2; 138/97, 98, 155, 112, 158

(56) References Cited

U.S. PATENT DOCUMENTS

| | | | | |
|---|---|---|---|---|
| 3,800,486 A | * | 4/1974 | Harvey | 52/98 |
| 5,395,472 A | * | 3/1995 | Mandich | 156/287 |

FOREIGN PATENT DOCUMENTS

| | | | | |
|---|---|---|---|---|
| DE | 3837992 A1 | * | 4/1990 | ............. E04C/5/16 |
| GB | 2226838 A | * | 7/1990 | ............ E21D/11/15 |

* cited by examiner

Primary Examiner—Heather Shackelford
Assistant Examiner—Lisa M. Saldano
(74) Attorney, Agent, or Firm—Edward P Dutkiewicz

(57) ABSTRACT

A sewer lining system comprising several components in combination. There is a plurality of longitudinal liner supports and a plurality of arcuate inner supports with each support having a plurality of threaded bolt holes running there through. There is a plurality of arcuate support locks, with a plurality of bolt holes there through. Bolts couple the arcuate inner supports to the arcuate support locks. Spacer pin subassemblies comprise a spacer pin and a pin locking collar and a plurality of locking bolts. Pipe spacers have a flange end and a pipe end. A sewer liner fabricated of a flexible degradation resistant material is formed into a tube configuration.

7 Claims, 4 Drawing Sheets

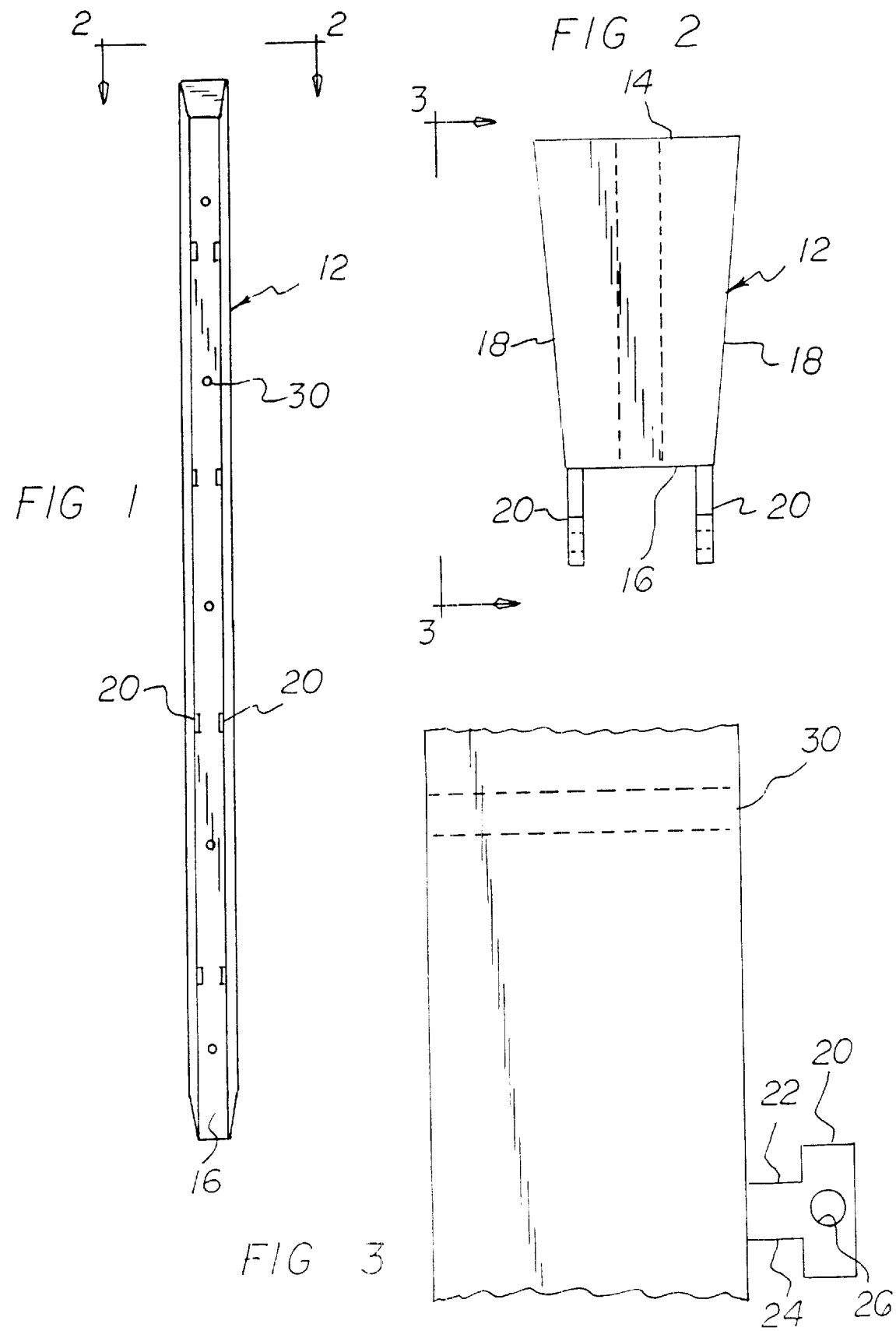

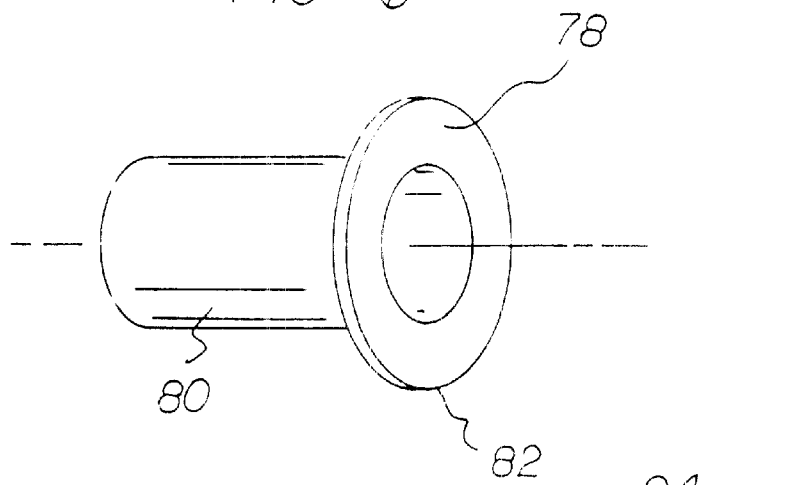
FIG 6
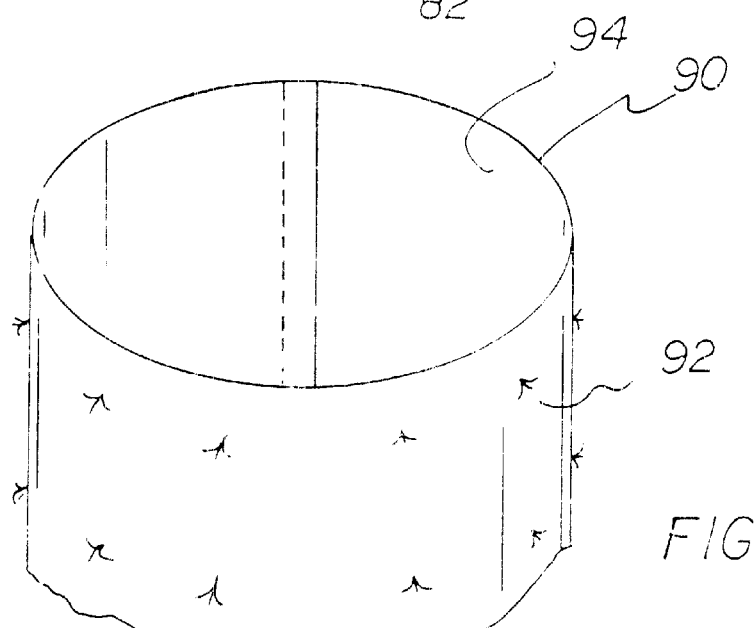
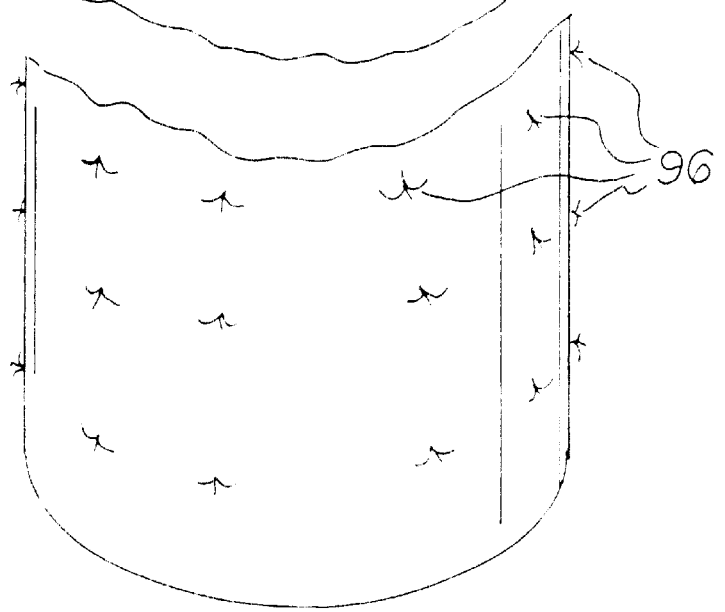
FIG 7

SEWER LINING SYSTEM

BACKGROUND OF THE INVENTION

1. Field of the Invention

The present invention relates to a sewer lining system and more particularly pertains to safely and efficiently relining old sewer manholes.

2. Description of the Prior Art

The use of sewer lining systems of known methods and apparatuses is known in the prior art. More specifically, sewer lining systems of known methods and apparatuses previously devised and utilized for the purpose of relining old sewer manholes are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,995,584 issued Feb. 26, 1991 to Trimble discloses a cast-in-place manhole liner apparatus. U.S. Pat. No. 4,997,602 issued Mar. 5, 1991 to Trimble discloses a cast-in-place manhole liner method. U.S. Pat. No. 5,017,313 issued May 21, 1991 to Trimble discloses a method and means for repairing an existing manhole. Lastly, U.S. Pat. No. 5,032,197 issued Jul. 16, 1991 to Trimble discloses a cast-in-place manhole liner method.

While these devices fulfill their respective, particular objectives and requirements, the aforementioned patents do not describe sewer lining system that allows safely and efficiently relining old sewer manholes.

In this respect, the sewer lining system according to the present invention substantially departs from the conventional concepts and designs of the prior art, and in doing so provides an apparatus primarily developed for the purpose of safely and efficiently relining old sewer manholes.

Therefore, it can be appreciated that there exists a continuing need for a new and improved sewer lining system which can be used for safely and efficiently relining old sewer manholes. In this regard, the present invention substantially fulfills this need.

SUMMARY OF THE INVENTION

In view of the foregoing disadvantages inherent in the known types of sewer lining systems of known methods and apparatuses now present in the prior art, the present invention provides an improved sewer lining system. As such, the general purpose of the present invention, which will be described subsequently in greater detail, is to provide a new and improved sewer lining system and method which has all the advantages of the prior art and none of the disadvantages.

To attain this, the present invention essentially comprises a manhole lining system for allowing a user to safely and efficiently line an existing manhole with a degradation resistant material. The system comprises several components in combination. First provided is a plurality of longitudinal liner supports. Each support is fabricated of a rigid material. It has a generally rectilinear configuration. Each support has an outer side, an inner side, two lateral sides there between, and a first length. The outer side has a first width of between about 1 ½ and 3 ½ inches. The two lateral sides each have a lateral side of a second width. The second width being between about 3 ½ and 6 ½ inches. Each outer side has a smooth flat surface of a first length and each inner side has the same first length. Each inner side has third width which is about ten percent less than the outer side. This difference in widths allows the supports to be aligned side by side to form an arcuate shape. Each inner side has a plurality of tabs protruding inwardly there from with each tab aligned along the long axis of the liner support. The tabs have an upper edge with a notch and a lower edge with a notch. Each tab has a bolt hole there through. Each liner support has a plurality of spacer holes having a diameter of between about ¼ and ¾ inch through the center of the inner side along the length of the liner support. Next provided is a plurality of arcuate inner supports. Each is fabricated of a rigid material with each having a convex outer side and a concave inner side and two side edges disposed there between. Each arcuate inner support has a thickness to fit securely within the notch of the tab. Each arcuate inner support has a plurality of threaded bolt holes running the thickness of the support from inner side to outer side. Next provided is a plurality of arcuate support locks. Each lock is fabricated of a rigid material and has a inner surface and an outer surface with a parallel upper edge and a parallel lower edge there between. Each support lock has a generally arcuate shape with a flat convex outer surface and a flat concave inner surface approximating the curved surfaces of the arcuate inner supports. Each arcuate support lock has a plurality of smooth bolt holes there through from inner surface to outer surface. Next provided is a plurality of bolts. The bolts are sized to be threadedly received into the threaded bolt holes of the arcuate inner supports. The bolts couple the arcuate inner supports to the arcuate support locks. Next provided is a plurality of spacer pin subassemblies. Each subassembly comprises a spacer pin, a pin locking collar and a plurality of locking bolts. The spacer pin is fabricated of rigid material and has a outer diameter sized to fit securely within the spacer hole of the liner support. The pin locking collar is fabricated of a rigid material. The collar has a central aperture there through sized to securely receive a spacer pin, with the outer diameter sized to be between about 100 and 300 percent larger than the outer diameter of the spacer pin. The collar has a plurality of radially oriented threaded locking bolt holes, with locking bolts sized to be threadedly received and securely held within the threads of the locking bolt holes of the collar. Next provided is a plurality of pipe spacers with each having a pipe end and a flange end. Lastly provided is a sewer liner. The liner is fabricated of a flexible degradation resistant material having an outer surface and an inner surface. The outer surface has a plurality of outwardly extending binding projections by which the liner may be coupled with a fresh pour of concrete. The liner is formed from a sheet of said material with two opposite ends of the liner being coupled to itself to form a liner tube having a constant cross sectional diameter. The liner tube has an open lower end and an open upper end.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sewer lining system which has all of the advantages of the prior art sewer lining systems of known methods and apparatuses and none of the disadvantages.

It is another object of the present invention to provide a new and improved sewer lining system which may be easily and efficiently manufactured and marketed.

It is further object of the present invention to provide a new and improved sewer lining system which is of durable and reliable constructions.

An even further object of the present invention is to provide a new and improved sewer lining system which is susceptible of a low cost of manufacture with regard to both materials and labor, and which accordingly is then susceptible of low prices of sale to the consuming public, thereby making such sewer lining system economically available to the buying public.

Even still another object of the present invention is to provide a sewer lining system for safely and efficiently relining old sewer manholes.

Lastly, it is an object of the present invention to provide a new and improved manhole lining system comprising several components in combination. First provided is a plurality of longitudinal liner supports. Next provided is a plurality of arcuate inner supports with each having a plurality of threaded bolt holes running there through. Next provided is a plurality of arcuate support locks, with each arcuate support lock having a plurality of smooth bolt holes there through. Next provided is a plurality of bolts sized to be threadedly received into the threaded bolt holes of the arcuate inner supports with the bolts coupling the arcuate inner supports to the arcuate support locks. There is next provided a plurality of spacer pin subassemblies each having a spacer pin and a pin locking collar and a plurality of locking bolts. Next provided is a plurality of pipe spacers with each pipe spacer having a flange end and a pipe end. Lastly provided is a sewer liner fabricated of a flexible degradation resistant material being formed into a tube configuration from a sheet of said material. The liner has an open lower end and an open upper end.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an inner side perspective view of a longitudinal liner support.

FIG. 2 is a top planar view taken from line 2—2 of FIG. 1 showing the inwardly disposed tabs.

FIG. 3 is a side planar close up view of the longitudinal liner support showing the tabs with the upper and lower notches, as well as the through pin hole.

FIG. 6 shows a perspective view of a pipe spacer.

FIG. 7 shows a perspective view of a liner tube.

The same reference numerals refer to the same parts throughout the various Figures.

DESCRIPTION OF THE PREFERRED EMBODIMENT

Figure 4:
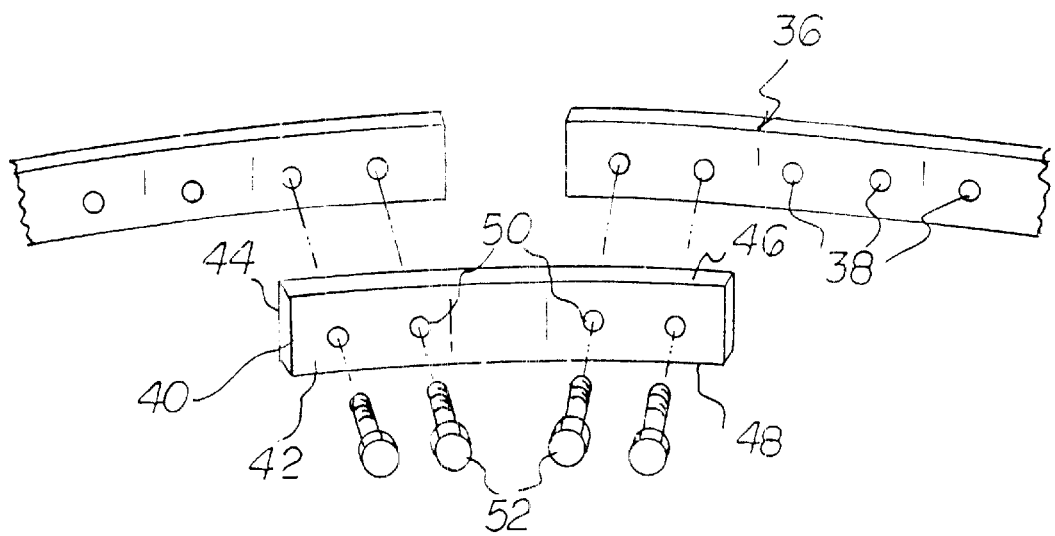
FIG. 4 is an exploded view of the arcuate inner supports and arcuate support locks, demonstrating the locking bolts to couple the two components.
Figure 5:
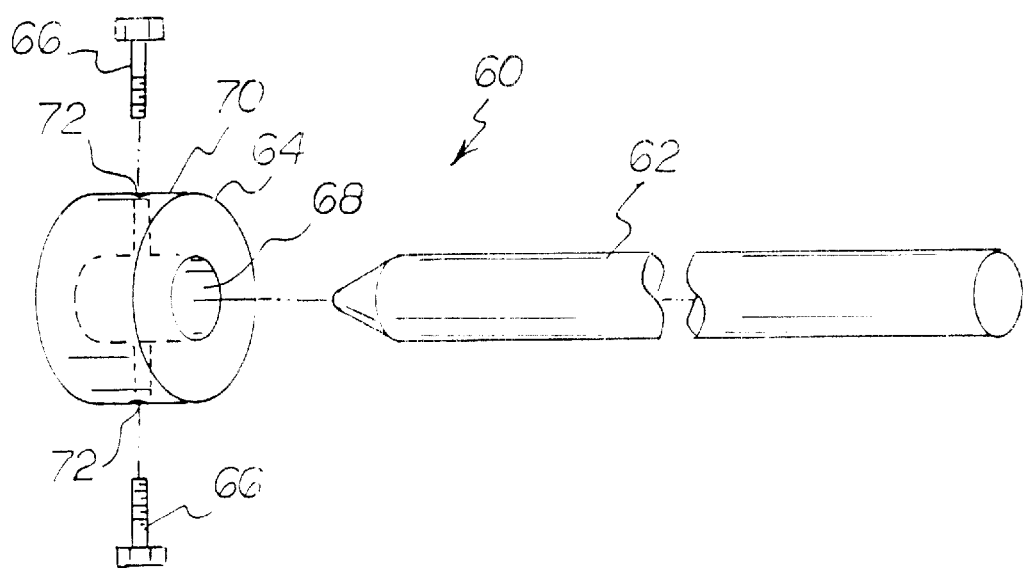
FIG. 5 shows an exploded view of the spacer pin subassemblies.
Figure 8:
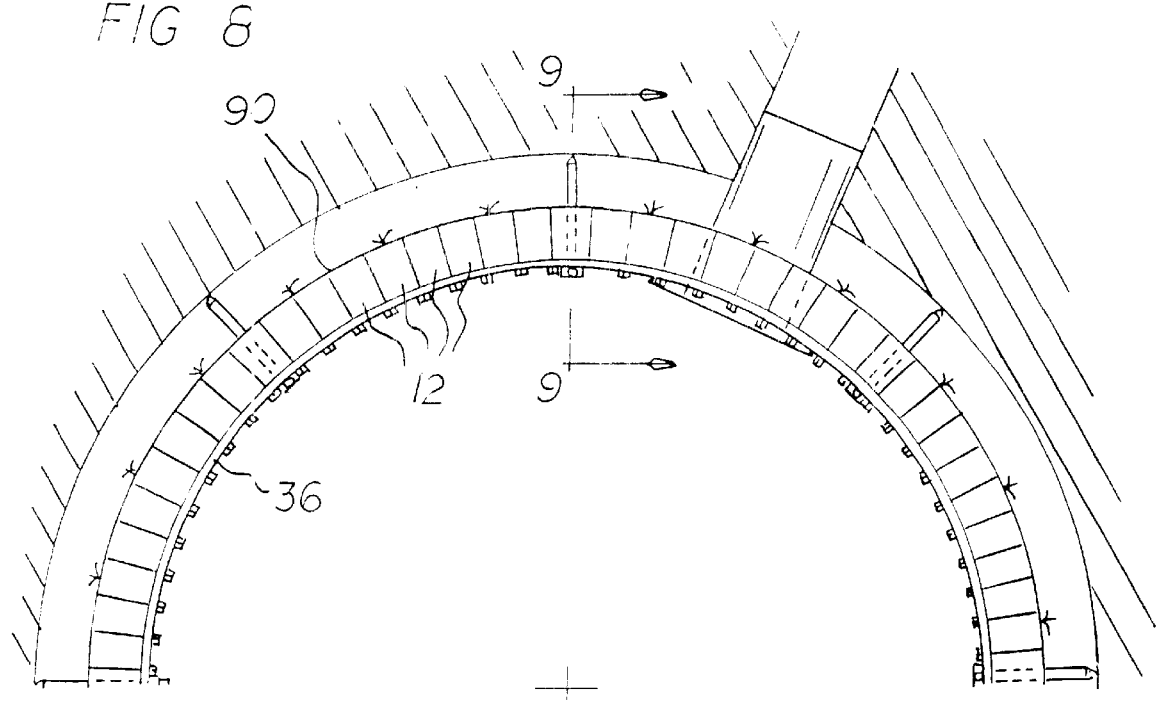
FIG. 8 shows a top planar view of the system in place in an existing manhole showing the pipe spacer and the pin subassemblies, with the liner tube in position.
Figure 9:
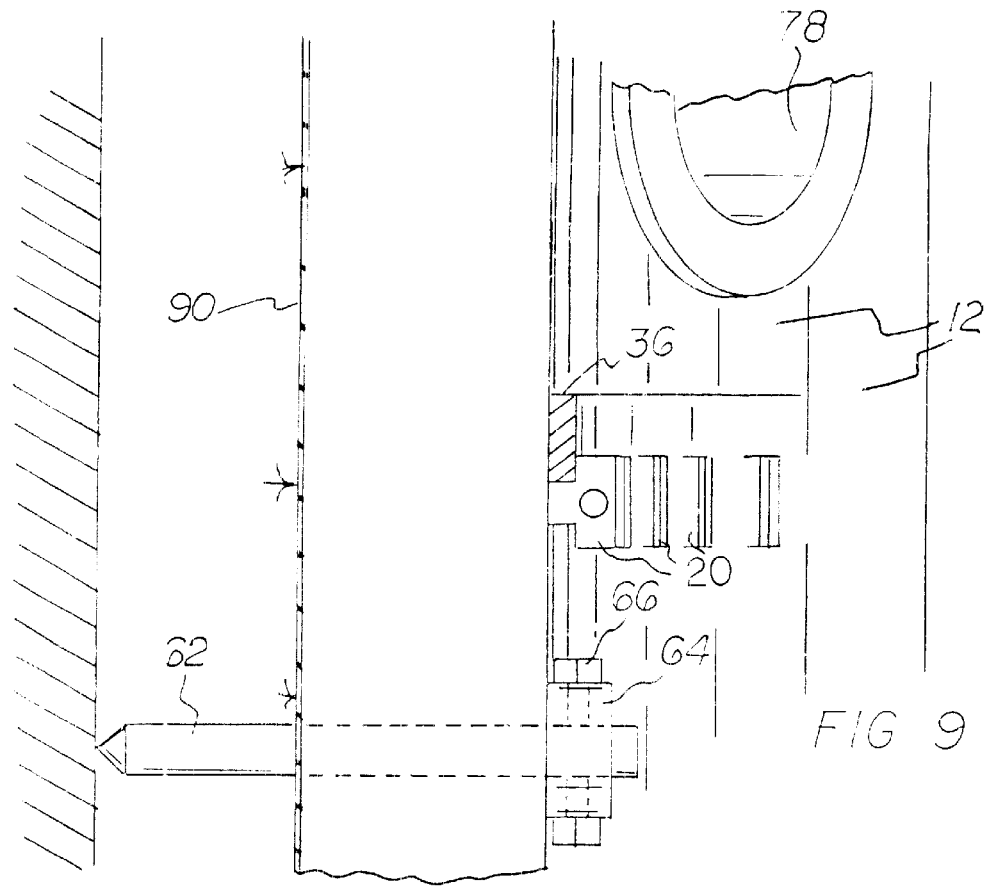
FIG. 9 shows a side view perspective close up of the pin subassembly and piper spacer and longitudinal supports.

With reference now to the drawings, and in particular to FIG. 1 thereof, the preferred embodiment of the new and improved sewer lining system embodying the principles and concepts of the present invention and generally designated by the reference numeral 10 will be described.

The present invention, the sewer lining system 10 is comprised of a plurality of components. Such components in their broadest context include a longitudinal support, a spacer pin subassembly, a pipe spacer and a locking system to keep the system in position during the relining procedure. Such components are individually configured and correlated with respect to each other so as to attain the desired objective.

A manhole lining system for allowing a user to safely and efficiently line an existing manhole with a degradation resistant material. The system comprises several components in combination.

First provided is a plurality of longitudinal liner supports 12. Each support is fabricated of a rigid material. It has a generally rectilinear configuration. Each support has an outer side 14, an inner side 16, two lateral sides 18 there between, and a first length. The outer side has a first width of between about 1 ½ and 3 ½ inches. The two lateral sides each have a lateral side of a second width. The second width being between about 3 ½ and 6 ½ inches. Each outer side has a smooth flat surface of a first length and each inner side has the same first length. Each inner side has third width which is between about 10 and 30 percent less than the outer side. This difference in widths allows the supports to be aligned side by side to form an arcuate shape.

Each inner side has a plurality of tabs 20 protruding inwardly there from with each tab aligned along the long axis of the liner support. The tabs have an upper edge with a notch 22 and a lower edge with a notch 24. Each tab has a bolt hole 26 there through.

Each liner support has a plurality of spacer holes 30 having a diameter of between about ¼ and ¾ inch through the center of the inner side along the length of the liner support.

Next provided is a plurality of arcuate inner supports 36. Each is fabricated of a rigid material with each having a convex outer side and a concave inner side and two side edges disposed there between. Each arcuate inner support has a thickness to fit securely within the notch of the tab. Each arcuate inner support has a plurality of threaded bolt holes 38 running the thickness of the support from inner side to outer side.

Next provided is a plurality of arcuate support locks 40. Each lock is fabricated of a rigid material and has a inner surface 42 and an outer surface 44 with a parallel upper edge 46 and a parallel lower edge 48 there between. Each support lock has a generally arcuate shape with a flat convex outer surface and a flat concave inner surface approximating the curved surfaces of the arcuate inner supports. Each arcuate support lock has a plurality of smooth bolt holes 50 there through from inner surface to outer surface.

Next provided is a plurality of bolts 52. The bolts are sized to be threadedly received into the threaded bolt holes of the arcuate inner supports. The bolts couple the arcuate inner supports to the arcuate support locks.

Next provided is a plurality of spacer pin subassemblies 60. Each subassembly comprises a spacer pin 62, a pin locking collar 64 and a plurality of locking bolts 66. The spacer pin is fabricated of rigid material and has a outer diameter sized to fit securely within the spacer hole of the liner support.

The pin locking collar is fabricated of a rigid material. The collar has a central aperture 68 there through sized to securely receive a spacer pin, with the outer diameter 70 sized to be between about 100 and 300 percent larger than the outer diameter of the spacer pin. The collar has a plurality of radially oriented threaded locking bolt holes 72, with locking bolts sized to be threadedly received and securely held within the threads of the locking bolt holes of the collar.

Next provided is a plurality of pipe spacers 78 with each having a pipe end 80 and a flange end 82.

Lastly provided is a sewer liner 90. The liner is fabricated of a flexible degradation resistant material having an outer surface 92 and an inner surface 94. The outer surface has a plurality of outwardly extending binding projections 96 by which the liner may be coupled with a fresh pour of concrete. The liner is formed from a sheet of said material with two opposite ends of the liner being coupled to itself to form a liner tube having a constant cross sectional diameter. The liner tube has an open lower end and an open upper end.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sewer lining system for allowing a user to safely and efficiently line an existing sewer structures with a degradation resistant material comprising, in combination:

a plurality of longitudinal liner supports with each support being fabricated of a rigid material with a generally rectilinear configuration and having an outer side and an inner side with the outer side being of a first width of between about 1 ½ inches and 3 ½ inches and two lateral sides disposed between the inner side and the outer side with each lateral side being of a second width of between about 3 ½ inches and 6 ½ inches with each outer side having a smooth flat surface of a first length and each inner side having the same first length along with an inner side third width being slightly less than the width of the outer side to allow the supports to be aligned side by side to form an arcuate shape, and with each inner side having a plurality of tabs protruding inwardly there from with each tab aligned along the long axis of the liner support with an upper edge with a notch and a lower edge with a notch, with each tab having a bolt hole there through, each liner support having a plurality of spacer holes through the center of the inner side along the length of the liner support;

a plurality of arcuate inner supports, each fabricated of a rigid material with each having a convex outer side and a concave inner side and two side edges disposed there between and each having a thickness to fit securely within the notch of the tab, with each arcuate inner support having a plurality of threaded bolt holes running the thickness of the support from inner side to outer side;

a plurality of arcuate support locks with each lock fabricated of a rigid material and having a inner surface and an outer surface with a parallel upper edge and a parallel lower edge there between, each support lock being generally arcuate shaped with a convex outer surface and a concave inner surface approximating the curved surfaces of the arcuate inner supports, with each arcuate support lock having a plurality of smooth bolt holes there through;

a plurality of bolts sized to be threadedly received into the threaded bolt holes of the arcuate inner supports with the bolts coupling the arcuate inner supports to the arcuate support locks;

a plurality of spacer pin subassemblies with each subassembly having a spacer pin and a pin locking collar and a plurality of locking bolts, the spacer pin fabricated of rigid material and having a outer diameter sized to fit securely within the spacer hole of the liner support, with the pin locking collar fabricated of a rigid material having a central aperture there through sized to securely receive a spacer pin, with the outer diameter sized to be between about 100 and 300 percent larger than the outer diameter of the spacer pin with the collar having a plurality of radially oriented threaded locking bolt holes, with locking bolts sized to be threadedly received and securely held within the threads of the locking bolt holes of the collar;

a plurality of pipe spacers with each pipe spacer having a flange end and a pipe end; and, a sewer liner fabricated of a flexible degradation resistant material having an outer surface and an inner surface with the outer surface having a plurality of outwardly extending binding projections by which the liner may be coupled with a fresh pour of concrete, with the liner being formed from a sheet of said material with the liner being coupled to itself to form a liner tube having a constant cross sectional diameter with the liner tube having an open lower end and an open upper end.

2. A sewer lining system comprising:

a plurality of longitudinal liner supports having a plurality of tabs with a bolt hole there through and the tabs each having more than one notch on the edge of the tab, with each of the supports having a plurality of spacer holes;

a plurality of arcuate inner supports sized to fit securely within the notch of the tab and each having a plurality of threaded bolt holes;

a plurality of arcuate support locks each having a generally arcuate shape with a plurality of smooth bolt holes;

a plurality of bolts to couple the arcuate inner supports to the arcuate support locks;

a plurality of spacer pin subassemblies with each subassembly having a spacer pin and a pin locking collar and a plurality of locking bolts; and a sewer liner tube fabricated of a degradation resistant material having a constant cross sectional diameter with the liner tube having an open lower end and an open upper end.

3. A sewer lining system as described in claim 2 with the system further comprising;

a plurality of longitudinal liner supports with the supports having a plurality of lengths of between about 1 foot and 15 feet, with the liner supports also having a plurality of outer side first widths of between about 1 ½ inches and 10 inches and a plurality of lateral side second widths of between about 1 inches and 9 inches and a plurality of inner side third widths of between about 4 inches and 8 inches.

4. A sewer lining system as described in claim 2 with the system further comprising a plurality of arcuate inner supports with the supports having a plurality of lengths and curvatures and sized to fit securely within the notch of the tab and each having a plurality of threaded bolt holes.

5. A sewer lining system as described in claim 2 with the system further comprising a plurality of arcuate support locks having a plurality of lengths and curvatures and each having a generally arcuate shape with a plurality of smooth bolt holes.

6. A sewer lining system as described in claim 2 with the system further comprising a plurality of spacer pin subassemblies with each subassembly having a plurality of differing sized spacer pins with the pins having a plurality of lengths and diameters, and a pin locking collar sized to fit the plurality of pins, and a plurality of locking bolts.

7. A sewer lining system as described in claim 2 with the system further comprising a sewer liner tube fabricated of a flexible degradation resistant material having a variable cross sectional diameter with the liner tube having an open lower end and an open upper end.

* * * * *